United States Patent
Ravichandran et al.

(10) Patent No.: US 11,965,476 B2
(45) Date of Patent: Apr. 23, 2024

(54) METHODS AND SYSTEM FOR STARTING AN ENGINE

(71) Applicant: Ford Global Technologies, LLC, Dearborn, MI (US)

(72) Inventors: Maruthi Ravichandran, Dearborn, MI (US); Calvin Trescott, Farmington Hills, MI (US); Jason Meyer, Canton, MI (US); Rajit Johri, San Francisco, CA (US); Jeffrey Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,925

(22) Filed: Jul. 28, 2021

(65) Prior Publication Data

US 2023/0031444 A1 Feb. 2, 2023

(51) Int. Cl.
*F02N 11/08* (2006.01)
*F02N 5/04* (2006.01)
*F02N 11/04* (2006.01)

(52) U.S. Cl.
CPC ............ *F02N 11/0859* (2013.01); *F02N 5/04* (2013.01); *F02N 11/04* (2013.01); *F02N 2200/105* (2013.01); *F02N 2200/123* (2013.01); *F02N 2200/124* (2013.01); *F02N 2200/125* (2013.01)

(58) Field of Classification Search
CPC . F02N 5/04; F02N 11/04; F02N 11/08; F02N 11/0859; F02N 2200/105; F02N 2200/123; F02N 2200/124; F02N 2200/125
See application file for complete search history.

(56) References Cited

U.S. PATENT DOCUMENTS

| | | | | |
|---|---|---|---|---|
| 6,396,165 B1* | 5/2002 | Nagano | ................. | F02N 11/006 903/910 |
| 7,102,313 B2* | 9/2006 | Kadota | ................. | B60W 10/08 318/434 |
| 9,308,807 B2* | 4/2016 | Hane | .................... | B60L 15/2081 |
| 2004/0121666 A1* | 6/2004 | Okuyama | ........... | F02N 11/0803 440/85 |
| 2008/0275624 A1* | 11/2008 | Snyder | .................... | B60K 6/445 903/905 |
| 2008/0275625 A1* | 11/2008 | Snyder | ................. | B60W 10/02 903/905 |
| 2010/0048353 A1* | 2/2010 | Iwase | ..................... | F02N 11/08 475/5 |
| 2014/0130635 A1* | 5/2014 | Kees | ..................... | F02N 11/006 474/101 |
| 2017/0259808 A1 | 9/2017 | Makled et al. | | |
| 2017/0259810 A1 | 9/2017 | Zhang et al. | | |
| 2018/0023493 A1* | 1/2018 | Khafagy | ............... | F02D 41/065 477/98 |
| 2018/0058353 A1* | 3/2018 | Khafagy | ............... | B60R 16/033 |

(Continued)

*Primary Examiner* — John Kwon
*Assistant Examiner* — Johnny H Hoang
(74) *Attorney, Agent, or Firm* — David Kelley; McCoy Russell LLP (57) ABSTRACT

Systems and methods for starting an engine of a hybrid vehicle are described. In one example, the method selects one or more electric machines to start an engine. The method may reference a data structure, such as a matrix or table, and the matrix or table outputs which of the one or more electric machines is applied to start the engine.

20 Claims, 4 Drawing Sheets

(56) References Cited

U.S. PATENT DOCUMENTS

| | | |
|---|---|---|
| 2018/0306157 A1 | 10/2018 | Lee et al. |
| 2018/0340503 A1 | 11/2018 | Kim |
| 2019/0376483 A1 | 12/2019 | Khafagy et al. |
| 2020/0216071 A1* | 7/2020 | Chen .................... B60W 10/08 |

* cited by examiner

| | Drive mode | | | | Driver Urgency | | | Road mu | | GPS | | Connected Vehicle | | Vehicle Proximity | | Selected Engine Start device |
|---|---|---|---|---|---|---|---|---|---|---|---|---|---|---|---|---|
| | norm | eco | sport | snow | low | med | high | Hi slip | norm | race | lights | light | norm | front | side | |
| 320 | x | | | | x | | | | x | | | | | | | FWS or BISG |
| 322 | x | | | | | x | | | x | | | | | | | ISG |
| 324 | x | | | | | | x | | x | | | | | | | ISG + (FWS or BISG) |
| 326 | x | | | | | | | x | | | | | | | | ISG |
| 328 | x | | | | | x | x | | x | | x | x | x | | x | ISG + (FWS or BISG) |
| 330 | x | | | | x | | | | | | | | x | | x | ISG |
| 332 | | x | | | x | x | | | | | | | | | | FWS or BISG |
| 334 | | | x | | x | x | x | | | | | | | | | ISG + (FWS or BISG) |
| 336 | | | x | | | x | | | | | | | | | | ISG + FWS + BISG |
| 338 | | | | x | | | x | | | | | | | | | ISG |
| 340 | | | | x | | x | x | | | | | | | | | ISG + (FWS or BISG) |
| 342 | - | - | - | - | - | - | x | | | x | | | | | | ISG + (FWS or BISG) |
| 344 | - | - | - | - | - | x | x | | | x | | | | | | ISG + FWS + BISG |

FIG. 4

METHODS AND SYSTEM FOR STARTING AN ENGINE

FIELD

The present description relates to methods and a system for starting an engine of a hybrid vehicle.

BACKGROUND AND SUMMARY

A hybrid vehicle may include one or more electric machines for providing propulsive effort. The electric machines that provide propulsive effort may also provide a secondary function of starting an engine of the hybrid vehicle. In addition, the hybrid vehicle may also include a conventional starter motor to start the engine. Thus, the hybrid vehicle may be started via three different electric machines. However, each of the electric machines may have different characteristics and attributes as compared to the other electric machines. For example, a conventional starter motor may start the engine with little vibration, but the conventional starter motor may have insufficient torque capacity to start the engine as fast as may be desired. Conversely, a driveline integrated starter/generator may have sufficient torque capacity to start the engine very rapidly, but the driveline integrated starter/generator may produce more vibrations during some conditions as compared to the conventional starter. It may be difficult to decide which electric machine or combination of electric machines provide the best starting solution given the unique characteristics of each electric machine and vehicle attributes. Therefore, it may be desirable to provide a way of selecting one or more engine starting devices that takes vehicle attributes into consideration.

The inventors herein have recognized the above-mentioned issues and have developed a method for starting an engine, comprising: selecting at least one engine starting device from a plurality of engine starting devices via a controller and a selection matrix; and starting an engine via the at least one engine starting device.

By selecting one or more electric machines to start an engine via a selection matrix, it may be possible to provide the technical result of starting the engine with one or more electric machines in a way that takes into account a plurality of vehicle operating considerations. For example, one engine starting device may generate higher torque levels than another engine starting device. Further, one engine starting device may generate more noise and vibration than another engine starting device. A selection matrix that is referenced via a plurality of vehicle operating considerations, such as vehicle drive mode and driver urgency level, may output engine starting devices that most closely meet vehicle attributes for vehicle operating conditions at the present time. The selection matrix may be superior to applying conditional combinational logic to determine engine starting devices because it may be simpler for vehicle developers to understand and work with. In addition, the selection matrix may be provided in a visual format that allows vehicle developers to recognize interactions between vehicle operating conditions and engine starter selection.

The present description may provide several advantages. In particular, the approach may simplify selection of an engine starting device for vehicles that include more than one engine starting device. Further, the approach may reduce vehicle development time. In addition, the approach may be transferrable from one type of hybrid vehicle to other types of hybrid vehicles.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to starting an engine via one or more engine starting devices. The engine may be started via a conventional flywheel starter, a belt integrated starter/generator, an integrated starter generator, and/or other electric machine that may or may not provide propulsive effort for a vehicle. The vehicle may be a hybrid vehicle as described herein or an alternatively configured hybrid vehicle. The engine may be started via one or more electric machines. The engine may be of the type shown in FIG. 1. The engine may be included in a driveline as shown in FIG. 2 or in another known hybrid driveline configurations (e.g., series or parallel). Engine starters may be selected via a data structure such as the selection matrix shown in FIG. 3. The engine may be started according to the method of FIG. 4.

Figure 1:
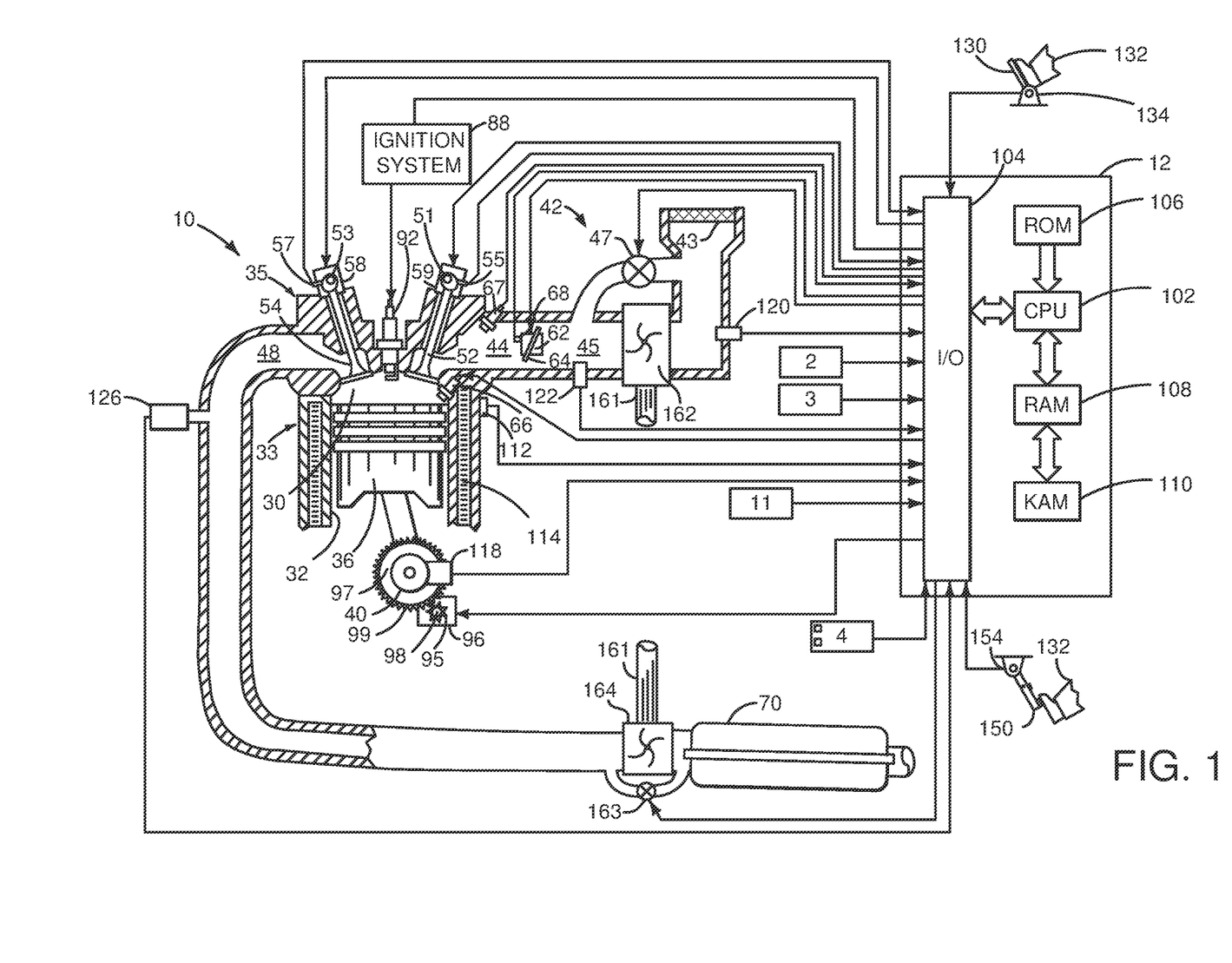
FIG. 1 is a schematic diagram of an engine.
Figure 2:
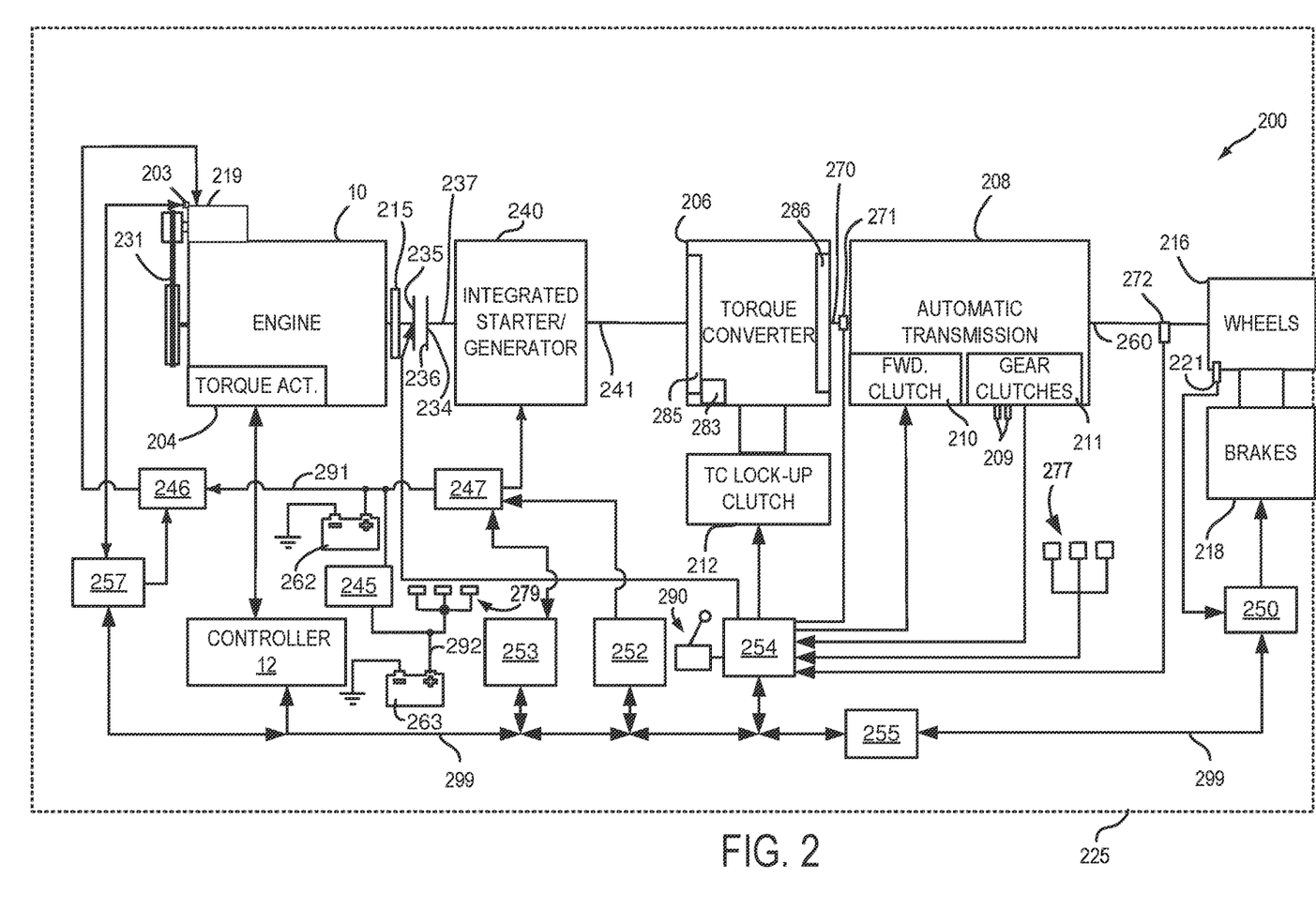
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine including a flywheel starter and a belt integrated starter/generator (BISG); an integrated starter/generator (ISG); and a controller including executable instructions stored in non-transitory memory that cause the controller to start the engine via at least one of the flywheel starter, the BISG, and the ISG according to a vehicle drive mode and a level of driver urgency. The system includes where the vehicle drive mode is one of a group comprising a normal mode, an economy mode, a sport mode, and a snow mode. The system includes where the level of driver urgency is classified as low, medium, or high. The system further comprises additional instructions that cause the controller to start the engine via at least one of the flywheel starter, the BISG, and the ISG based further on a road slip classification. The system further comprises additional instructions that cause the controller to start the engine via at least one of the flywheel starter, the BISG, and the ISG based further on proximity of other vehicles to a vehicle that includes the engine. The system further comprises additional instructions to reference a data structure via the vehicle drive mode and the level of driver urgency. The system further comprises additional instructions to reference the data structure via vehicle proximity data and an estimate of a road coefficient of friction.

Figure 3:
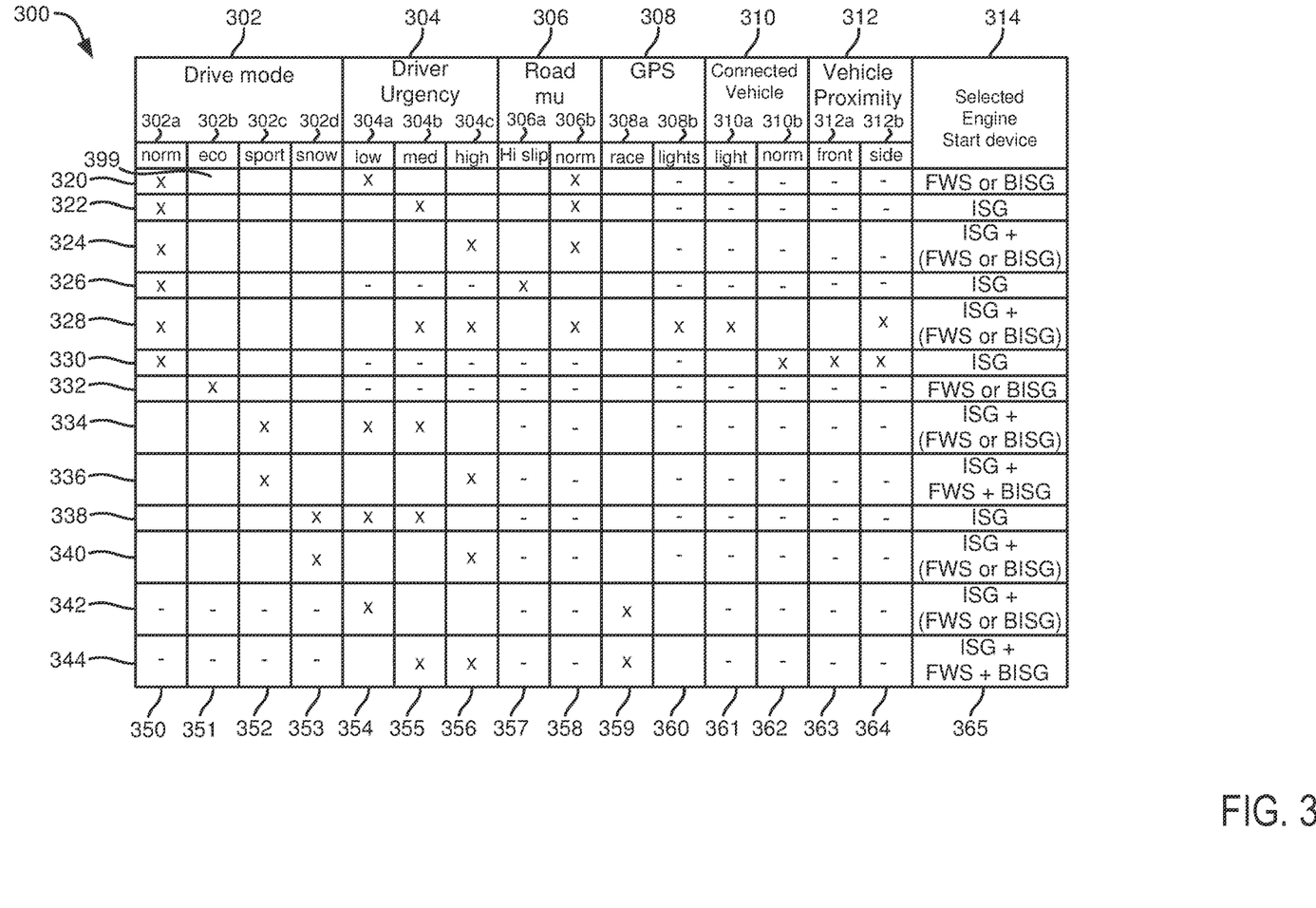
FIG. 3 shows an example engine starting device selectin matrix.

Referring now to FIG. 3, a graphic representation of a data structure 300 for selecting one or more electric machines to start an internal combustion engine is shown. Data structure 300 may also be referred to as a matrix, table, or selection matrix. In this embodiment, data structure 300 is shown as a two dimensional data structure, but it may be three dimensional in other examples.

Data structure 300 may be referenced or indexed via a plurality of vehicle operating considerations shown in bins 302-312. In this example, vehicle operating considerations include vehicle drive mode 302, driver urgency 304, road mu (coefficient of friction) 306, global position system (GPS) features (e.g., objects that are located via GPS coordinates) 308, connected vehicle information (e.g., traffic levels) 310, and vehicle proximity information (e.g., locations of other vehicles relative to the present vehicle) 312. However, in other examples, additional or fewer vehicle operating considerations may be applied to reference the data structure 300. The vehicle operating considerations are broken down further into sub-considerations (e.g., 302*a*, 302*b*, 302*c*, 302*d*, 304*a*, 304*b*, 304*c*, 306*a*, etc.), and each sub-consideration is associated with a column (e.g., 350-364) of data structure 300. One additional column (e.g., 365) defines which engine starting devices are to be applied to start the engine. The data structure 300 also includes rows (e.g., 320-344). The rows and columns intersect to form cells (e.g., 399).

In this example, the drive mode consideration 302 is subdivided into normal mode 302*a*, economy mode 302*b*, sport mode 302*c*, and snow mode 302*d*. These modes may stiffen or loosen the vehicle's suspension, adjust wheel torque limits, and provide other vehicle modifications that may be suited to the sub-considerations. The driver urgency consideration 304 is shown subdivided into low 304*a*, medium 304*b*, and high 304*c* sub-considerations. The road coefficient of friction consideration 306 is subdivided into hi-slip (e.g., low coefficient of friction) 306*a* sub-consideration, and normal (high coefficient of friction) sub-consideration 306*b*. The GPS consideration is subdivided into a race track consideration 308*a*, and a traffic signal (e.g., lights) consideration 308*b*. The connected vehicle consideration 310 is sub-divided into a light traffic consideration 310*a* and a normal traffic consideration 310*b*. The vehicle proximity consideration is sub-divided into a front (e.g., vehicles in front of the present vehicle) sub-consideration 312*a*, and a rear (e.g., vehicles in the rear of the present vehicle) sub-consideration 312*b*. It should be appreciated that the sub-considerations mentioned herein are only for purposes of describing the invention and should not be considered as limiting.

The cells (e.g., 399) may include nothing (e.g., operating consideration not present), a dash "-" (e.g., operating consideration present or not present (irrelevant)), or a "X" (e.g., consideration present). The column (e.g., 365) that defines which engine starting device may start the engine includes abbreviations for flywheel starter (FWS), belt integrate starter/generator (BISG), and the integrated starter generator (ISG). If a cell includes ISG, the engine is started applying only the ISG. If a cell includes ISG+(FWS or BISG), the engine is started with the ISG and the FWS or by the ISG and the BISG. If a cell includes FWS or BISG, the engine may be started via the FWS or the BISG. If a cell includes FWS+BISG+ISG, all three electric machines are applied to start the engine.

The data structure 300 may be referenced via the vehicle operating considerations and the data structure outputs engine starting devices according to the vehicle operating considerations. For example, a vehicle occupant or driver (e.g., human or autonomous) may select a vehicle operating mode and a controller (e.g., 12) may receive the selected vehicle operating mode via a human/machine interface (e.g., 11). The controller may also receive a driver demand input via driver demand pedal (e.g., 130). The controller may determine a level of driver urgency based on the rate of change in the driver demand pedal and the present driver demand pedal position. For example, if the rate of driver demand pedal change is less than a first threshold, the driver urgency level may be determined to be low. If the rate of driver demand pedal change is greater than the first threshold and less than a second threshold, the driver urgency level may be determined to be medium. If the rate of driver demand pedal change is greater than the second threshold, the driver urgency level may be determined high. The controller may determine that the vehicle is traveling on a low mu, high slip road according to wheel speeds and the vehicle's actual speed. The controller may determine that the vehicle is on a race track or approaching road conditions (e.g., traffic signs/lights/intersections etc.) according to output of a navigation system that applies GPS. The controller may also determine if traffic near the present vehicle is light or normal based on data from other vehicles that is supplied to the controller. The controller may also determine if other vehicles are in front of or to the side of the present vehicle according to vehicle proximity sensors.

The operating sub-considerations, if present, reference the data structure columns to determine what engine starting devices should be applied to start the engine. Each vehicle operating consideration has an "X" or a "-" in a corresponding row for the row to define which engine starting devices are to start the engine. For example, row number one (e.g., 320) includes an "X" in the sub-consideration column "normal" or 302a, so row 302 may indicate that the FSW or BISG is to start the engine. However, for row 302 to be the basis for selecting the engine starting device, the driver urgency must be low (e.g., X present at row 320 column 354), road mu must be normal (e.g., X present at row 320 column 358), GPS must indicate traffic signals are or are not present and race track is not present (e.g., "-" present at row 320 column 360), the connected vehicle data is irrelevant, and the vehicle proximity data is irrelevant for row number one to be the row that indicates which engine starting devices are to be applied to start the engine.

In another example, if the drive mode sub-mode is economy, then the engine may be started via the FWS or BISG irrespective of driver urgency, road mu, GPS input, connected vehicle input, and vehicle proximity input.

In yet another example, of the drive mode is "sport" and the driver urgency is "low" or "medium," the engine may be started via the ISG and the FWS or by the ISG and the BISG irrespective of road mu, GPS data, connected vehicle data, and vehicle proximity data. However, if the drive mode is "sport" and the driver urgency is "hi," then the engine may be started via the ISG, the BISG, and the FWS irrespective of road mu, GPS data, connected vehicle data, and vehicle proximity data.

In this way, the vehicle operating considerations may reference the data structure and values or parameters in cells of the data structure that are referenced via the vehicle operating considerations may indicate which engine starting devices are to be applied to start the engine.

Figure 4:
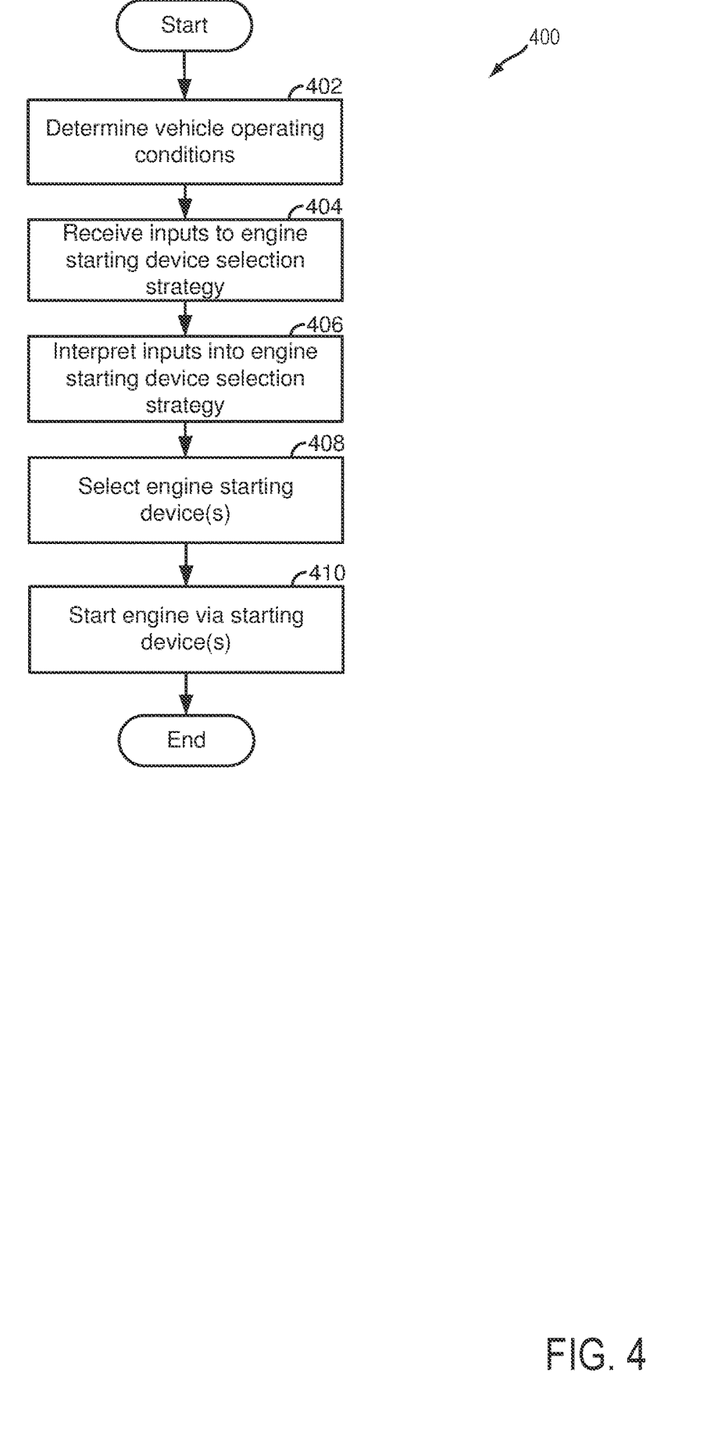
FIG. 4 shows an example method for selecting one or more engine starters and starting the engine via the one or more starters.

Turning now to FIG. 4, a flowchart of a method for selecting one or more engine starting devices from a group of engine starting devices included with a vehicle is shown. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, vehicle position, proximity of other vehicles to the present vehicle, traffic signaling device locations, and battery state of charge. Method 400 proceeds to 404.

At 404, method 400 receives inputs to an engine starting device selection strategy. The inputs may include, but are not limited to vehicle drive mode, driver urgency, road mu estimate, connected vehicle data, GPS data, and vehicle proximity data. The vehicle drive mode may be received via a human/machine interface. The driver urgency level may be estimated based on input from a driver demand pedal and vehicle speed. The road mu estimate may be based on vehicle wheel speeds and a vehicle reference speed. The connected vehicle data, GPS data, and vehicle proximity data may be received from vehicle subsystems and sensors that are supplied to controller 12 or a vehicle system controller. Method 400 proceeds to 406.

At 406, method 400 interprets inputs to the engine starting device selection strategy. The inputs may allow the controller to interpret driver intent (e.g., to drive aggressively, to drive passively, to drive relaxed, etc.). Method 400 may also interpret how the vehicle's driver and/or passengers may want the vehicle to behave based on the inputs that are received to the engine starting device selection strategy.

In one example, a vehicle manufacturer may determine attributes of each engine starting device of a vehicle. For example, a vehicle manufacturer may determine that a FWS starter may start an engine with a low noise and vibration level at select vehicle operating conditions. The vehicle manufacturer may also determine that an ISG may be applied to start an engine more quickly than a BISG or a FWS due to a high torque capacity of the ISG. The vehicle manufacturer may determine that the BISG may restart an engine quickly and smoothly if a driver change of mind occurs between a time when fuel injection to an engine is deactivated and when the engine's crankshaft speed is less than a threshold speed (e.g., 50 RPM). The vehicle's manufacturer may apply this type of information when defining relationships between vehicle operating considerations and selected engine starting devices so that the vehicle may respond as intended by the vehicle's occupants (e.g., the human driver) and predetermined vehicle attributes (e.g., low noise and vibration, high noise and vibration, responsiveness, fuel economy, durability, etc.) for the vehicle and the vehicle's operating mode. One way of defining the relationships between vehicle operating considerations and selecting engine starting devices is shown in FIG. 3. Specifically, an X or other parameter may be provided in a cell of a data structure to indicate that for a particular set of vehicle operating considerations, a particular group of engine starting devices is suited to provide a best match of vehicle attributes to the vehicle operating considerations. The cell may be in a row that corresponds to a particular group of engine starting devices as shown in FIG. 3. Thus, the placement of parameters (e.g., X's or dashes as shown in FIG. 3) in the data structure delivers desired vehicle attributes according to present vehicle operating considerations. Method 400 proceeds to 408.

At 408, method 400 selects one or more engine starting device according to vehicle operating considerations and vehicle attributes. In one example, as discussed in the description of FIG. 3, one or more engine starting devices may be selected to start an engine via a selection matrix or data structure. Vehicle operating considerations may reference columns in the matrix and the cells of columns may include parameters (e.g., X's as shown in FIG. 3) that link the vehicle operating considerations with the engine starting devices. To determine which engine starting device is activated to start the engine when a particular set of vehicle operating considerations are present, method 400 references the data structure or matrix via the present vehicle operating considerations and queries cells in the matrix that correspond to columns where the vehicle operating consideration is active. Based on the cells that contain parameters, method 400 determines a single row and the engine starting devices are selected according to the single row.

For example, applying the matrix of FIG. 3 for illustration, if the present drive mode is "economy" as indicated by an "X" or "-," then method 400 selects FWS or BISG for starting the engine since for all other vehicle operating considerations other than driver mode may be present or not present. In other words, the parameters for operating considerations other than driver mode are don't care, which puts row 332 in control and defines the engine starting devices as FWS and BISG.

In another example, again applying the matrix of FIG. 3 for illustration, if the present drive mode is "sport" as indicated by an "X" or '-," then one of rows 334 and 336 will be in control. To determine which row is in control, method 400 queries the cells of rows 334 and 336 according to which of the vehicle considerations are active to determine which row is controlling. If the driver urgency is medium or high, row 334 will be in control since columns 354 and 355 indicate that row 334 controls when driver urgency is medium or high. The other vehicle operating considerations fall into don't care because they have dashes "-" that indicate don't care parameters. Row 334 indicates that the engine is to be started via the ISG and FWS, or via the ISG and the BISG. Method 400 proceeds to 410 after the engine starting device is selected.

At 410, method 400 starts the engine via the selected engine starting devices. Starting the engine may include rotating the engine via the selected engine starting devices and supplying fuel and spark to the engine. For example, if the FWS and the ISG are selected, the FSW may engage the engine and the ISG may simultaneously apply torque to rotate the engine. The driveline disconnect clutch may be closed to transfer torque from the ISG to the engine during engine starting. Method 400 proceeds to exit after the engine is started.

The method of FIG. 4 provides for a method for starting an engine, comprising: selecting at least one engine starting device from a plurality of engine starting devices via a controller and a selection matrix; and starting an engine via the at least one engine starting device. The method includes where the selection matrix is referenced via a plurality of vehicle considerations. The method includes where the vehicle considerations include vehicle drive mode, driver urgency level, road mu, global positioning data, connected vehicle data, and vehicle proximity data. The method includes where the selection matrix outputs at least one engine starting device. The method includes where the vehicle considerations are each subdivided into at least two sub-considerations. The method includes where the at least one engine starting device includes a flywheel starting device. The method includes where the at least one engine starting device includes a belt integrated starter generator. The method includes where the at least one engine starting device includes an integrated starter/generator.

The method of FIG. 4 also provides for a method for starting an engine, comprising: categorizing one or more vehicle operating considerations into at two least sub-considerations for each of the one or more vehicle operating considerations; and starting an engine via one or more electric machines based on a presence of at least one sub-consideration. The method includes where the one or more vehicle operating considerations are a basis for referencing a data structure. The method includes where the data structure is a matrix. The method includes where the one or more electric machines include a flywheel starter, an integrated starter/generator, and a belt integrated starter/generator. The method includes where the one or more vehicle operating considerations are inputs to a controller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine of a vehicle, comprising:
    selecting at least one engine starting device from a plurality of engine starting devices in the vehicle via a controller and a selection matrix stored in memory of the controller, where the selection matrix is a data structure referenced via a plurality of vehicle operating considerations, where the data structure includes entries that form different combinations of the plurality of vehicle operating considerations within the data structure, and where each of the different combinations of the plurality of vehicle operating considerations corresponds to an entry representing one or more of the plurality of engine starting devices in the data structure; and
    starting an engine via the at least one selected engine starting device.

2. The method of claim 1, where the plurality of vehicle operating considerations include vehicle proximity data.

3. The method of claim 2, where the plurality of vehicle operating considerations include vehicle drive mode, driver urgency level, road mu, global positioning data, and connected vehicle data.

4. The method of claim 3, where the plurality of vehicle operating considerations are each subdivided into at least two sub-considerations.

5. The method of claim 4, where the at least one engine starting device includes a flywheel starting device.

6. The method of claim 4, the at least one engine starting device includes a belt integrated starter generator.

7. The method of claim 4, where the at least one engine starting device includes an integrated starter/generator.

8. The method of claim 1, where the plurality of vehicle operating considerations are categorized into at two least sub-considerations for each of the plurality of vehicle operating considerations within the data structure.

9. The method claim 1, further comprising referencing the data structure via vehicle proximity data to select the at least one selected engine starting device.

10. A system, comprising:
an engine including a flywheel starter and a belt integrated starter/generator (BISG);
an integrated starter/generator (ISG); and
a controller including executable instructions stored in non-transitory memory that cause the controller to reference a selection matrix and start the engine via at least one of the flywheel starter, the BISG, and the ISG according to a vehicle drive mode and a level of driver urgency that is based on a rate of change of a driver demand pedal,
where the selection matrix is a data structure referenced via a plurality of vehicle operating considerations including the vehicle drive mode and the level of driver urgency,
where the data structure includes entries that form different combinations of the plurality of vehicle operating considerations within the data structure, and
where each of the different combinations of the plurality of vehicle operating considerations corresponds to an entry representing one or more of the flywheel starter, the BISG, and the ISG.

11. The system of claim 10, the vehicle drive mode is one of a group comprising a normal mode, an economy mode, a sport mode, and a snow mode.

12. The system of claim 11, where the level of driver urgency is classified as low, medium, or high.

13. The system of claim 12, further comprising additional instructions that cause the controller to start the engine via at least one of the flywheel starter, the BISG, and the ISG based further on a road slip classification.

14. The system of claim 13, further comprising additional instructions that cause the controller to start the engine via at least one of the flywheel starter, the BISG, and the ISG based further on proximity of other vehicles to a vehicle that includes the engine.

15. The system of claim 10, further comprising additional instructions to reference the data structure via the vehicle drive mode and the level of driver urgency.

16. The system of claim 15, further comprising additional instructions to reference the data structure via vehicle proximity data and an estimate of a road coefficient of friction.

17. A method for starting an engine of a vehicle, comprising:
categorizing one or more vehicle operating considerations into at two least sub-considerations for each of the one or more vehicle operating considerations of a selection matrix,
where the selection matrix is a data structure referenced via the one or more vehicle operating considerations,
where the data structure includes entries that form different combinations of the one or more vehicle operating considerations within the data structure, and
where each of the different combinations of the one or more vehicle operating considerations corresponds to an entry representing one or more electric machines of the vehicle in the data structure; and
starting the engine via the one or more electric machines in the vehicle based on a presence of at least one sub-consideration.

18. The method of claim 17, where the one or more electric machines include a flywheel starter, an integrated starter/generator, and a belt integrated starter/generator.

19. The method of claim 17, where the one or more vehicle operating considerations are inputs to a controller.

20. The method of claim 17, further comprising referencing the data structure via vehicle proximity data to select the one or more electric machines for starting the engine.

* * * * *